United States Patent
Shimomura

(10) Patent No.: US 10,864,781 B2
(45) Date of Patent: Dec. 15, 2020

(54) PNEUMATIC TIRE

(71) Applicant: TOYO TIRE & RUBBER CO., LTD., Itami (JP)

(72) Inventor: Kazuo Shimomura, Itami (JP)

(73) Assignee: TOYO TIRE CORPORATION, Itami (JP)

( * ) Notice: Subject to any disclaimer, the term of this patent is extended or adjusted under 35 U.S.C. 154(b) by 353 days.

(21) Appl. No.: 15/786,004

(22) Filed: Oct. 17, 2017

(65) Prior Publication Data

US 2018/0178591 A1    Jun. 28, 2018

(30) Foreign Application Priority Data

Dec. 28, 2016 (JP) ................................. 2016-255573

(51) Int. Cl.
*B60C 15/06* (2006.01)
*B60C 15/00* (2006.01)
(Continued)

(52) U.S. Cl.
CPC .............. *B60C 15/06* (2013.01); *B60C 13/04* (2013.01); *B60C 15/0045* (2013.01);
(Continued)

(58) Field of Classification Search
CPC ........... B60C 2015/0614; B60C 15/06; B60C 15/0045; B60C 15/00; B60C 15/0628;
(Continued)

(56) References Cited

U.S. PATENT DOCUMENTS 3,052,275 A * 9/1962 Hylbert, Jr. ............. B60C 15/06
152/554
3,232,331 A * 2/1966 Cappa et al. ........... B60C 15/06
152/546
(Continued)

FOREIGN PATENT DOCUMENTS

GB     2102354 A     2/1983
JP     56138008 A  * 10/1981
(Continued)

OTHER PUBLICATIONS

Office Action dated Jul. 12, 2019, issued in counterpart CN Application No. 201710710064.4, with English translation (15 pages).

*Primary Examiner* — Adrienne C. Johnstone
(74) *Attorney, Agent, or Firm* — Westerman, Hattori, Daniels & Adrian, LLP

(57) ABSTRACT

A pneumatic tire has a rim strip rubber. A radial height of the rim strip rubber on the basis of an outer diameter position of a bead core is equal to or more than 70% of a radial height of a tire outer diameter position. An upper end of a side reinforcing layer is arranged closer to an outer side radially than an upper end of a bead filler. A distance from a tire maximum width position to the upper end of the side reinforcing layer is equal to or less than 5 mm. The maximum thickness Tw of the rim strip rubber between the upper end of the bead filler and the upper end of the side reinforcing layer is greater than the maximum thickness Tm of the rim strip rubber closer to the outer side radially than the upper end of the side reinforcing layer.

9 Claims, 2 Drawing Sheets

(51) Int. Cl.
    *B60C 13/00*       (2006.01)
    *B60C 13/04*       (2006.01)
(52) U.S. Cl.
    CPC .......... *B60C 15/0628* (2013.01); *B60C 13/00* (2013.01); *B60C 2013/007* (2013.01); *B60C 2013/045* (2013.01); *B60C 2015/061* (2013.01); *B60C 2015/065* (2013.01); *B60C 2015/0614* (2013.01); *B60C 2015/0642* (2013.01); *Y10T 152/10828* (2015.01); *Y10T 152/10837* (2015.01)
(58) Field of Classification Search
    CPC ...... B60C 2015/061; B60C 2015/0642; B60C 2015/0678; B60C 13/00; B60C 13/04; B60C 2013/045; B60C 2013/005; B60C 2013/006; B60C 2013/007; Y10T 152/10828; Y10T 152/10837
    USPC ........................................ 152/543, 546, 554
    See application file for complete search history.

(56) References Cited

U.S. PATENT DOCUMENTS

| | | | | |
|---|---|---|---|---|
| 4,096,899 | A | * | 6/1978 | Kitazawa ............ B60C 15/0045 152/543 |
| 5,361,820 | A | * | 11/1994 | Adachi .................. B60C 15/06 152/546 |
| 5,707,462 | A | * | 1/1998 | Kikuchi .................. B60C 15/06 152/554 |
| 7,316,255 | B2 | * | 1/2008 | Nakagawa .............. B60C 15/06 152/546 |
| 9,340,074 | B2 | * | 5/2016 | Shima ..................... B60C 15/06 |
| 2014/0027034 | A1 | * | 1/2014 | Molzow-Voit ...... B60C 15/0045 |

FOREIGN PATENT DOCUMENTS

| | | | |
|---|---|---|---|
| JP | 2001341506 A | * | 12/2001 |
| JP | 2003-312213 A | | 11/2003 |
| JP | 2006188176 A | * | 7/2006 |
| JP | 2013-241043 A | | 12/2013 |
| JP | 2014-54925 A | | 3/2014 |

* cited by examiner

PNEUMATIC TIRE

BACKGROUND OF THE INVENTION

Field of the Invention

The present invention relates to a pneumatic tire which can achieve excellent steering stability performance and ride comfort performance while maintaining a rolling resistance.

Description of the Related Art

In general, the pneumatic tire tends to generate a local deflection in an outer region in a tire radial direction of a side wall portion, so called a buttress region. As a result, the steering stability performance tends to be lowered due to generation of yawing, and the ride comfort performance tends to be deteriorated by deflection being prevented in a whole of the tire. Conventionally, the rigidity of the buttress region has been enhanced by increasing a thickness of the tire, thereby suppressing the local deflection, however, since an energy loss is increased by increasing the thickness of the buttress region, there has been a problem that the rolling resistance is deteriorated.

Patent document 1 describes a pneumatic tire in which a height of a rim strip rubber is set to be between 36 and 44% of a height from an inner edge of the tire to an equator. However, since the rim strip rubber having this degree of height is not arranged in the buttress region, an effect of suppressing the local deflection by enhancing the rigidity of the buttress region can not be obtained.

Patent document 2 describes a pneumatic tire in which the height of the rim strip rubber is changed in a wavy manner within a range between 0.5 and 0.7 times of a tire cross sectional height, and an average height is set to be equal to or less than 0.6 times of the tire cross sectional height. However, since the height of the rim strip rubber is periodically lowered, it is thought that the rigidity of the buttress region can not be sufficiently enhanced. In the first place, in Patent document 2, the effect of improving the rolling resistance is thought to be deteriorated if the average height goes beyond 0.6 times of the tire cross sectional height.

Patent document 3 describes a pneumatic tire in which an upper end of the rim strip rubber is arranged between 60 and 75% of the tire cross sectional height on the basis of a tire outer diameter position (between 25 and 40% on the basis of a bead base line), and a lower end of an inner rubber layer of a side wall rubber having a multilayer rubber structure is arranged between 30 and 50% of the tire cross sectional height on the basis of the tire outer diameter position (between 50 and 70% on the basis of the bead base line). However, there is fear that the rolling resistance is deteriorated by the distortion being locally concentrated into the upper end of the rim strip rubber and the lower end of the inner rubber layer.

PRIOR ART DOCUMENT

Patent Document

Patent Document 1: JP-A-2014-54925
Patent Document 2: JP-A-2013-241043
Patent Document 3: JP-A-2003-312213

SUMMARY OF THE INVENTION

The present invention is trade by taking the actual condition mentioned above into consideration, and an object of the present invention is to provide a pneumatic tire which can achieve excellent steering stability performance and ride comfort performance while maintaining a rolling resistance.

The present invention provides a pneumatic tire comprising a carcass layer which gets to a bead portion from a tread portion via a side wall portion, a side reinforcing layer which extends in a tire radial direction from the bead portion to the side wall portion, a side wall rubber which forms an outer surface of the side wall portion, and a rim strip rubber which forms an outer surface of the bead portion, wherein an annular bead core and a bead filler provided in an outer side in the tire radial direction of the bead core are buried in the bead portion, wherein the rim strip rubber extends in the tire radial direction between the carcass layer and the side wall rubber, and a height of the rim strip rubber on the basis of an outer diameter position of the bead core is equal to or more than 70% of a height of a tire outer diameter position, wherein an upper end of the side reinforcing layer is arranged closer to an outer side in the tire radial direction than an upper end of the bead filler, and a distance in the tire radial direction from a tire maximum width position to the upper end of the side reinforcing layer is equal to or less than 5 mm, and wherein the maximum thickness Tw of the rim strip rubber in a first height region between the upper end of the bead filler and the upper end of the side reinforcing layer is formed greater than the maximum thickness Tm of the rim strip rubber closer to the outer side in the tire radial direction than the upper end of the side reinforcing layer.

In the pneumatic tire, since the height of the rim strip rubber on the basis of the outer diameter position of the bead core is equal to or more than 70% of the height of the tire outer diameter position, the rigidity of the buttress region is enhanced. As a result, it is possible to improve the steering stability performance and the ride comfort performance by suppressing the local deflection of the buttress region.

Further, in the tire, the upper end of the side reinforcing layer is arranged in the vicinity of the tire maximum width position via the distance which is equal to or less than 5 mm, and the thickness of the rim strip rubber in the first height region is formed relatively larger. As a result, the rigidity of the peripheral portion of the tire maximum width position is enhanced, and the rigidity difference is enlarged between the peripheral portion of the tire maximum width position and the outer side portion in the tire radial direction which is adjacent to the peripheral portion. Accordingly, the distortion tends to be generated at the position where the rigidity difference is great, and it is possible to improve the steering stability performance by dispersing the distortion having an inclination to be concentrated to the buttress region. Further, since the distortion is reduced in the buttress region which causes the energy loss, the rolling resistance can be maintained while enlarging the height of the rim strip rubber.

In the light of enhancement of the rigidity of the buttress region by the rim strip rubber, it is preferable that a height of the rim strip rubber on the basis of a bead base line is equal to or more than 75% of a tire cross sectional height.

In order to achieve the effect of dispersing the distortion of the buttress region mentioned above, it is sufficient to locally enlarge the thickness of the rim strip rubber in the first height region, and the outer peripheral surface of the rim strip rubber in the first height region is preferably formed by the first curved surface which bulges to the outer side in the tire width direction for appropriately forming the rim strip rubber having the thickness mentioned above. In the same viewpoint, the outer peripheral surface of the rim strip rubber is preferably formed in the second height region between the exposed position of the interface between the side wall rubber and the rim strip rubber, and the upper end of the bead filler, by the second curved surface which is depressed to the inner side in the tire width direction, and the second curved surface is smoothly connected to the first curved surface. In this case, since the thickness of the rim strip rubber is suppressed in the second height region, it is advantageous for improving the ride comfort performance.

It is preferable that the upper end of the side reinforcing layer is arranged at the tire maximum width position or arranged closer to the outer side in the tire radial direction than the tire maximum width position. As a result, the maximum thickness Tw of the rim strip rubber is set in the vicinity of the maximum width position which is positioned within the first height region, and the rigidity is enhanced in the peripheral portion including the tire maximum width position. Therefore, it is possible to effectively disperse the distortion having an inclination to be concentrated to the buttress region, and it is possible to achieve a more excellent steering stability performance while well maintaining the rolling resistance.

The thickness Tw of the rim strip rubber is preferably equal to or more than 1.1 times of the thickness Ts of the rim strip rubber at the upper end position of the side reinforcing layer for enlarging the rigidity difference between the peripheral portion of the tire maximum width position and the outer side portion in the tire radial direction which is adjacent to the peripheral portion.

In the light of improvement of the ride comfort performance while suppressing the thickness of the rim strip rubber in the second height region, the thickness Tw of the rim strip rubber is preferably equal to or more than 1.1 times of the minimum thickness Tn of the rim strip rubber within the second height region between the exposed position of the interface between the side wall rubber and the rim strip rubber, and the upper end of the bead filler.

It is preferable that a wound-up end of the carcass layer wound up in the bead portion reaches a belt layer which is buried in the tread portion. According to the structure mentioned above, the rigidity of the buttress region can be enhanced not only by the rim strip rubber but also by the carcass layer.

DETAILED DESCRIPTION OF THE PREFERRED EMBODIMENTS

An embodiment of the present invention will be explained with reference to the drawings.

Figure 1:
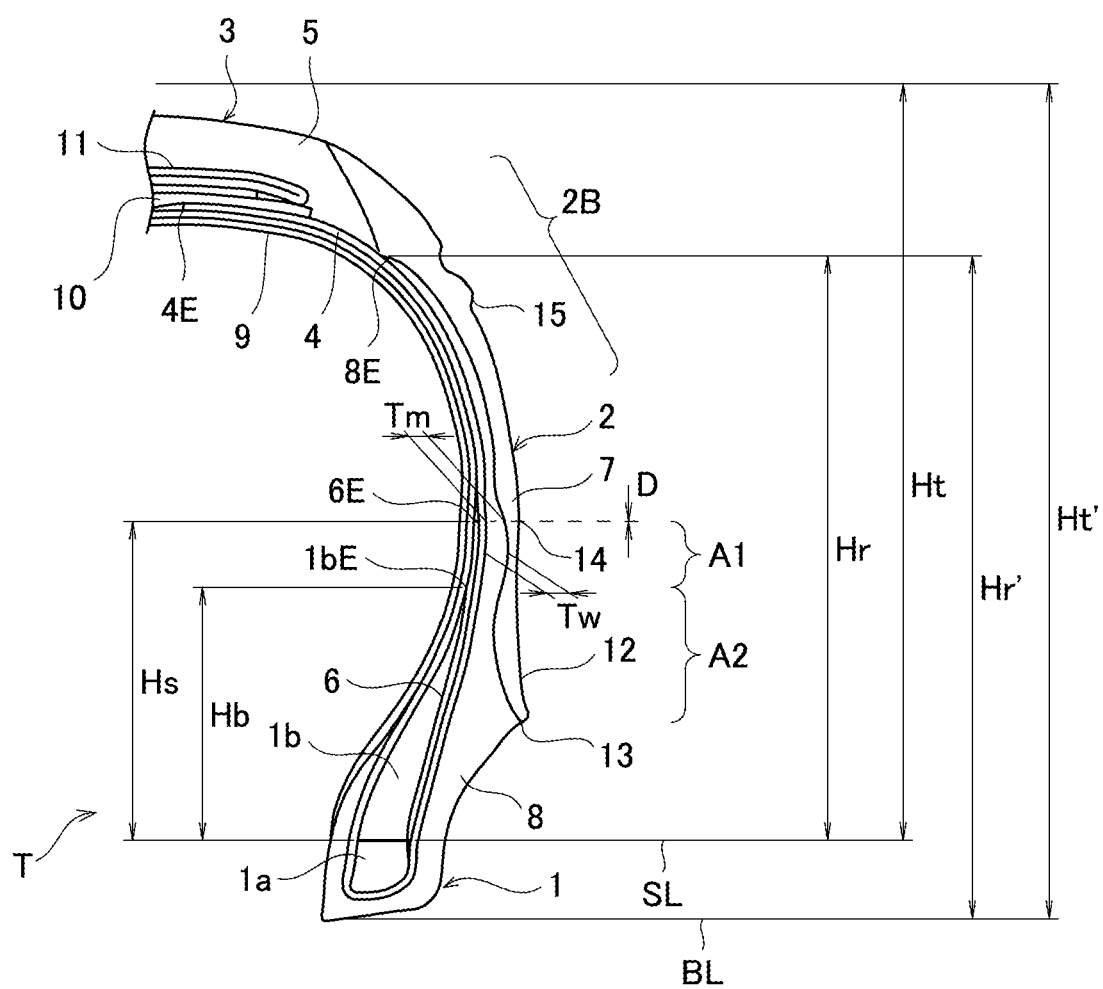
FIG. 1 is a tire meridian partial cross sectional view showing an example of a pneumatic tire according to the present invention.

A pneumatic tire T shown in FIG. 1 includes a pair of bead portions 1, sidewall portions 2 extending from the bead portions 1 toward an outer side in the tire radial direction, respectively, and a tread portion 3 connected to the outer ends in the tire radial direction of the sidewall portions 2. An annular bead core 1a and a bead filler 1b are buries in the bead portion 1, the bead filler 1b being provided in an outer side in a tire radial direction of the bead core 1a. The bead core 1a is formed by coating a converged body such as a steel wire with a rubber. The bead filler 1b is formed by a hard rubber which extends to an outer side in the tire radial direction and is formed into a triangular cross section. The buttress region 2B is a region in an outer side in the tire radial direction of the side wall portion 2 and is also a region which is not grounded at the normal traveling time on a flat paved road.

The pneumatic tire T is further provided with a carcass layer 4 which gets to the bead portion 1 from the tread portion 3 via the side wall portion 2, a tread rubber 5 which forms an outer surface of the tread portion 3, a side reinforcing layer 6 which extends in a tire radial direction from the bead portion 1 to the side wall portion 2, a side wall rubber 7 which forms an outer surface of the side wall portion 2, and a rim strip rubber 8 which forms an outer surface of a bead portion 1. An inner side of the carcass layer 4 is provided with an inner liner rubber 9 for retaining pneumatic pressure. An inner side of the tread rubber 5 in the tire radial direction is provided with a belt layer 10 which is laminated on the carcass layer 4, and a belt reinforcing layer 11 which is laminated on to the belt layer 10.

The carcass layer 4 is formed by a carcass ply obtained by coating with the rubber a plurality of cords arranged in a direction which is approximately orthogonal to the tire circumferential direction. Metals such as steel and organic fibers such as polyester, rayon, nylon and aramid are preferably employed for the material of the cord. The carcass layer 4 is constructed by one sheet of carcass ply, however, plural sheets of laminated carcass plies may be used in place of this. In the present embodiment, since a super high turn-up structure is employed as mentioned below, the effect of improving the rigidity achieved by the carcass layer 4 can be appropriately obtained even if the number of the carcass ply is one.

The carcass layer 4 is wound up (turned up) in the bead portion 1 so as to pinch the bead core 1a and the bead filler 1b. In other words, the carcass layer 4 is provided with the wound-up ply which is arranged in the outer sides of the bead core 1a and the bead filler 1b in the tire width direction in series, to the main body ply which gets to the bead portion 1 from the tread portion 3 via the side wall portion 2. The wound-up end 4E is an end portion of (the wound-up ply of) the wound-up carcass layer 4.

The belt layer 10 is formed by the belt ply obtained by coating a plurality of cords arranged in a direction which is inclined to the tire circumferential direction, with the rubber. The belt layer 10 is constructed by plural sheets (two sheets in the present embodiment) of belt plies, and is laminated in such a manner that the cords intersect in inverted directions to each other between the plies. The steel is preferably employed for the material of the cord. The belt reinforcing layer 11 is formed by a reinforcing ply obtained by coating the cords extending substantially in the tire circumferential direction with the rubber. The organic fibers as mentioned above are preferably employed for the material of the cord. It is possible to suppress the floating-up of the belt ply at the high-speed traveling time so as to improve a high-speed durability by covering the end portion of the belt layer 10 with the belt reinforcing layer 11.

The side reinforcing layer 6 is formed by a side ply obtained by coating with the rubber a plurality of cords which are aligned in parallel to each other. The cords constructing the side ply in the present embodiment are the steel cords, and are arranged in a direction which is inclined to the tire circumferential direction. A lower end (an inner end in the tire radial direction) of the side reinforcing layer 6 is arranged in a lateral side of the bead core 1a. The side reinforcing layer 6 is provided in such a manner as to be interposed between the bead filler 1b and the wound-up ply of the carcass layer 4, however, may be provided in such a manner as to be attached to the outer side in the tire width direction of the carcass layer 4.

A rim protector 12 formed by making an outer surface of the bead portion 1 bulge to an outer side in the tire width direction is formed in the bead portion 1 of the tire T according to the present embodiment. The rim protector 12 has a function of preventing deformation and damage of a rim flange caused by contact with stone curbs in a shoulder. The rim strip rubber 6 is continuously provided in an inner side of the side wall rubber 7 in the tire radial direction, and an exposes position 13 of an interface thereof is set in an inner peripheral surface of the rim protector 12. The pneumatic tire according to the present invention is not limited to the structure in which the rim protector mentioned above is formed.

The tire maximum width position 14 is a position where a profile line of the outer surface of the tire T in the side wall portion 2 gets most away from the tire equator in the tire width direction. The profile line is a profile of an outer surface of the side wall portion main body except the projection such as the rim protector 12, and generally has a tire meridian cross sectional shape which is defined by smoothly connecting a plurality of circular arcs.

The rim strip rubber 8 is provided at a position which is in contact with a rim (not shown) to which the tire T is installed. The rim strip rubber 8 is formed by the rubber which is excellent in a wear resistance, and a modulus of the rim strip rubber 8 is higher than a modulus of the side wall rubber 7. Since the rim strip rubber 8 according to the present embodiment extends long in the tire radial direction and is arranged in the side wall portion 2, the modulus of the rim strip rubber 8 is preferably lower than the modulus of the bead filler 1b in the light of not raising a vertical rigidity of the tire T excessively. The modulus indicates a 100% elongation modulus (M100) which is measured on the basis of JISK6251.

The rim strip rubber 8 extends in the tire radial direction between the carcass layer 4 and the side wall rubber 7. A height Hr of the rim strip rubber 8 on the basis of the outer diameter position of the bead core 1a buried in the bead portion 1 is equal to or more than 70% of a height Ht of the tire outer diameter position. A reference line SL is a virtual line which extends in the tire width direction through the outer diameter position of the bead core 1a. The height Hr is a distance in the tire radial direction from the reference line SL to the upper end 8E of the rim strip rubber 8, and the height Ht is a distance in the tire radial direction to the tire outer diameter position therefrom. The upper end indicates an outer end in the tire radial direction in the member.

In the pneumatic tire T, the upper end 6E of the side reinforcing layer 6 is arranged closer to the outer side in the tire radial direction than the upper end 1bE of the bead filler 1b. The distance in the tire radial direction between the upper end 6E and the upper end 1bE is, for example, equal to or more than 5 mm. The distance corresponds to a length of a first height region A1 mentioned later. The height Hs of the side reinforcing layer 6 on the basis of the outer diameter position of the bead core 1a is, for example, between 40 and 65% of the height Ht. The height Hb of the bead filler 1b is, for example, between 35 and 60% of the height Ht in the same manner. Further, the distance D in the tire radial direction from the tire maximum width position 14 to the upper end 6E of the side reinforcing layer 6 is equal to or less than 5 mm. More specifically, the upper end 6E is arranged in the vicinity of the tire maximum width position 14 via the distance which is equal to or less than 5 mm, in the tire T. The distance D is preferably equal to or less than 3 mm, and more preferably equal to or less than 2 mm. In the present embodiment, the upper end 6E is arranged at the tire maximum width position 14, and the distance D is zero.

Figure 2:
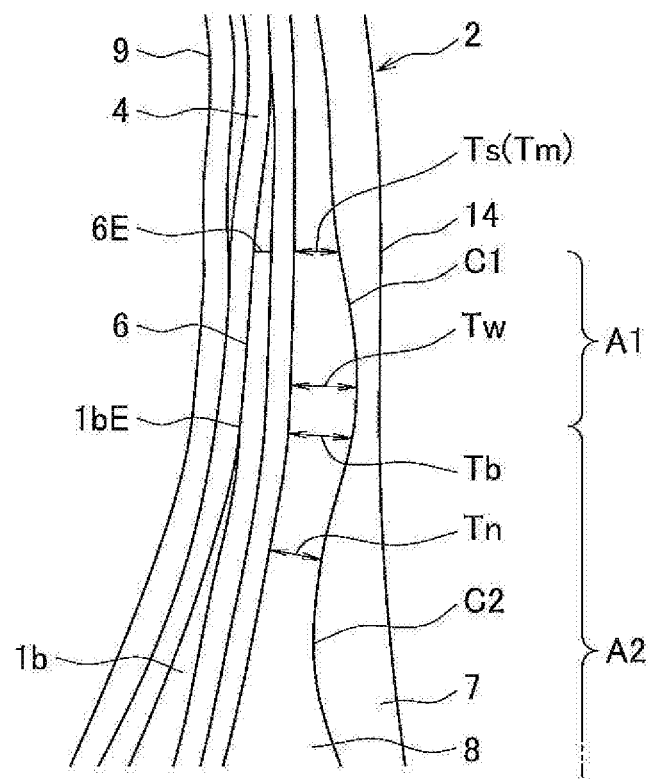
FIG. 2 is a cross sectional view showing a substantial part of the tire in FIG. 1.

Further, in the pneumatic tire T, the maximum thickness Tw of the rim strip rubber 8 in the first height region A1 between the upper end 1bE of the bead filler 1b and the upper end 6E of the side reinforcing layer 6 is formed larger than the maximum thickness Tm of the rim strip rubber closer to the outer side in the tire radial direction than the upper end 6E of the side reinforcing layer 6. As shown in FIG. 2 in an enlarged manner, the thickness of the rim strip rubber 8 becomes the greatest in the vicinity of the tipper end 6E closer to the outer side in the tire radial direction than the upper end 6E. The thickness of the rim strip rubber 8 is measured along the direction which is perpendicular to the carcass layer 4.

In the tire T, the height Hr is equal to or more than 70% of the height Ht as mentioned above, and the rim strip rubber 8 is arranged in the buttress region 2B. Therefore, the rigidity of the buttress region 2B is enhanced. As a result, it is possible to improve the steering stability performance and the ride comfort performance by suppressing the local deflection of the buttress region 2B.

Further, in the tire T, the upper end 6E is arranged in the vicinity of the tire maximum width position 14, and the thickness of the rim strip rubber 8 is formed relatively large in the first height region A1. Therefore, the rigidity of the peripheral portion of the tire maximum width position 14 is enhanced, and the rigidity difference is enlarged between the peripheral portion of the tire maximum width position 14 and the outer side portion in the tire radial direction which is adjacent to the peripheral portion. As a result, the distortion tends to be generated at the position having the great rigidity difference, and it is possible to improve the steering stability performance by dispersing the distortion having an inclination to be concentrated to the buttress region 2B. Further, since it is possible to reduce the distortion in the buttress region 2B which causes the energy loss, the rolling resistance can be maintained while enlarging the height of the rim strip rubber 8. In order to achieve the effect of dispersing the distortion mentioned above, it is important to set the position where the rigidity difference is great as mentioned above.

In the light of enhancement of the rigidity of the buttress region 2B, a height Hr' of the rim strip rubber 8 on the basis of a bead base line BL is preferably equal to or more than 75% of a tire cross sectional height Ht'. In the present embodiment, the upper end 8E of the rim strip rubber 8 does not reach the tread rubber 5, however, the structure is not limited to this. The upper end 8E is arranged closer to the outer side in the tire radial direction than the upper end 1bE of the bead filler 1b and the upper end 6E of the side reinforcing layer 6, and is arranged closer to the inner side in the tire radial direction than the wound-up end 4E of the carcass layer 4. The height of the rim strip rubber 8 is substantially fixed along the tire circumferential direction.

In the present embodiment, a step portion 15 is formed in an outer surface of the buttress region 2B. The step portion 15 is provided at a position corresponding to a fitting portion between a sector and the side plate of a curing mold. In the light of preventing the distortion at the traveling from being locally concentrated to the periphery of the step portion 15, the upper end 8E is preferably positioned closer to the outer side in the tire radial direction than an intersecting point between a normal line extending perpendicular to the carcass layer 4 through an apex of the step portion 15 and the outer surface of the carcass layer 4, and the upper end 8E is preferably 5 mm or more away from the intersecting point.

In the present embodiment, the outer peripheral surface of the rim strip rubber 8 in the first height region A1 is formed by a first curved surface C1 which bulges to an outer side in the tire width direction. At the tire maximum width position 14, the outer surface of the rim strip rubber 8 is formed by a curved surface which bulges toward an outer side in the tire width direction (a right side in FIG. 2), and a thickness thereof is locally enlarged.

Further, in the present embodiment, the outer peripheral surface of the rim strip rubber 8 in a second height region A2 is formed by a second curved surface C2 which is depressed to an inner side in the tire width direction (a left side in FIG. 2), the second height region A2 being provided between the exposed position 13 of the interface between the side wall rubber 7 and the rim strip rubber 8, and the upper end 1$b$E of the bead filler 1$b$, and the second curved surface C2 is smoothly connected to the first curved surface C1. According to the structure mentioned above, since the thickness of the rim strip rubber 8 can be suppressed in the second height region A2, it is also advantageous for improving the ride comfort performance.

In the present embodiment, the thickness of the rim strip rubber 8 becomes the maximum at the exposed position 13 of the interface between the side wall rubber 7 and the rim strip rubber 8. The thickness of the rim strip rubber 8 is reduced little by little from the exposed position 13 of the interface toward the outer side in the tire radial direction to be the thickness Tn, and is increased little by little therefrom toward the outer side in the tire radial direction to be the thickness Tw. The thickness Tw is the maximum thickness of the rim strip rubber 8 in the first height region A1 as mentioned above. The thickness Tn is the minimum thickness of the rim strip rubber 8 in the second height region A2.

The rim strip rubber 8 is reduced its thickness little by little from the upper end 6E of the side reinforcing layer 6 toward the outer side in the tire radial direction as shown in FIG. 2, thereafter extends along the carcass layer 4 while maintaining the fixed thickness, and is reduced its thickness in the upper end 8E. The thickness Tm is the maximum thickness of the rim strip rubber 8 closer to the outer aide in the tire radial direction than the upper end 6E. The thickness Ts is the thickness of the rim strip rubber 8 at the upper end position of the side reinforcing layer 6. In the present embodiment, the point where the thickness of the rim strip rubber 8 becomes the maximum closer to the outer side in the tire radial direction than the upper end 6E is the vicinity of the upper end 6E thereof as mentioned already, and the thickness Ts is substantially the same as the thickness Tm.

The upper end 6E of the side reinforcing layer 6 is preferably arranged at the tire maximum width position 14 or is preferably arranged closer to the outer side in the tire radial direction than the tire maximum width position 14, and the present embodiment employs the former position. As a result, the maximum thickness Tw of the rim strip rubber 8 is set in the vicinity of the tire maximum width position 14 which is positioned within the first height region A1, and the rigidity is enhanced in the peripheral portion including the tire maximum width position 14. Therefore, it is possible to effectively disperse the distortion having an inclination to be concentrated to the buttress region 2B, and it is possible to achieve the more excellent steering stability performance while well maintaining the rolling resistance.

In order to enlarge the rigidity difference between the peripheral portion of the tire maximum width position 14 and the outer side portion in the tire radial direction adjacent thereto, the thickness Tw of the rim strip rubber 8 is preferably equal to or more than 1.1 times of the thickness Ts, more preferably equal to or more than 1.3 times, and further preferably equal to or more than 1.5 times. In the same viewpoint, the thickness Tw of the rim strip rubber 8 is preferably equal to or more than 1.1 times of the thickness Tm, more preferably equal to or more than 1.3 times, and further preferably equal to or mere than 1.5 times. Further, in the light of improving the ride comfort performance while suppressing the thickness of the rim strip rubber 8 in the second height region A2, the thickness Tw of the rim strip rubber 8 is preferably equal to or mere than 1.1 times of the thickness Tn, more preferably equal to or more than 1.2 times, and further preferably equal to or more than 1.3 times.

In the present embodiment, the wound-up end 4E of the carcass layer 4 wound up in the bead portion 1 reaches the belt layer 10 which is buried in the tread portion 3. This is also called as the super high turn-up structure, and the wound-up end 4E is arranged closer to the inner side in the tire width direction than the end portion of the belt layer 10. As a result, the rigidity of the buttress region 2B is enhanced not only by the rim strip rubber 8 but also by the carcass layer 4.

Each of the dimensions of the tire T mentioned above such as the height Hr of the rim strip rubber 8 is assumed to be measured in a state in which the tire is installed to a standard rim, a regular internal pressure is charged and any load is not applied. The rubber interface as shown can be specified in the tire cross section after the cure molding, and can be discriminated according to a nature of the rubber interface which is thin observed in the cross section, for example, by cutting the tire with a sharp cutting tool.

The standard rim is a rim which is defined every tire in a standard system including the standard on which the tire is based, for example, a standard rim in JATMA, "Design Rim" in TRA or "Measuring Rim" in ETRTO. The regular internal pressure is the pneumatic pressure defined every tire in the standard system including the standard on which the tire is based, and if set to the maximum pneumatic tire in JATMA, the maximum value described in Table "TIRE LOAD LIMITS AT VARIOUS COLD INFLATION PRESSURES" in TRA, and "INFLATION PRESSURE" in ETRTO.

The pneumatic tire according to the present invention can be structured in the same manner as the normal pneumatic tire except the matter that the rim strip rubber and the side reinforcing layer are structured as mentioned above, and the conventionally known materials, shapes and manufacturing methods can be all employed in the present invention. The structure of the rim strip rubber as mentioned above maybe applied at least to one side of the tire, however, is preferably applied to both sides of the tire for enhancing the improving effect.

The present invention is not limited to the embodiment mentioned above, but can be variously modified and changed within the scope of the present invention.

EXAMPLES

An example which concretely shows the structure and effect of the present invention will be explained. In the following performance evaluations (1) to (3), the tire having the size 295/40R20 106Y was installed to the rim of 20×10.5, and the pneumatic pressure was set to 250 kPa.

(1) Rolling Resistance

The rolling resistance was measured according to the test method which is defined in JIS D 4234 (ISO28580). The evaluation was made by an index number in which the result of a comparative example 1 is set to 100, and the smaller the numerical value is, the smaller the rolling resistance is, which indicates the good rolling resistance.

(2) Steering Stability Performance

The tire was installed to the vehicle (SUV of 3000 cc class) and travels on an evaluation road surface, and a subjective test was carried out by a driver on the basis of execution of turning, braking and accelerating tests. The evaluation was made by an index number in which the result of the comparative example 1 is set to 100, and the larger the numerical value is, the more excellent the steering stability performance is.

(3) Ride Comfort Performance

The tire was installed to the vehicle (SUV of 3000 cc class) and travels on a dry evaluation road surface, and a subjective test was carried out by the driver. The evaluation was made by an index number in which the result of the comparative example 1 is set to 100, and the larger the numerical value is, the more excellent the ride comfort performance is.

Comparative Examples 1 to 3 and Working Example 1

Comparative examples 1 to 3 and a working example 1 were set by differentiating the aspect of the rim strip rubber in the embodiment mentioned above. The comparative example 1 was structured such that the upper end of the rim strip rubber does not reach the tire maximum width position. The comparative examples 2 and 3 were structured such that the rim strip rubber is reduced little by little its thickness from the exposed position of the interface toward the outer side in the tire radial direction and thereafter extends in the tire radial direction with a fixed thickness. The working example 1 was structured as shown in FIGS. 1 and 2. The other structures of the tires are common in each of the examples. In Table 1, the thickness Tb is the thickness of the rim strip rubber at the upper end position of the bead filler.

TABLE 1

|  | Comparative example 1 | Comparative example 2 | Comparative example 3 | Working example 1 |
|---|---|---|---|---|
| Height Hr/Ht (%) | 35 | 55 | 70 | 70 |
| Height Hs/Ht (%) | 32 | 32 | 32 | 32 |
| Height Hb/Ht (%) | 23 | 23 | 23 | 23 |
| Thickness Tn (mm) | 2.5 | 2.5 | 2.5 | 2.0 |
| Thickness Tb (mm) | 2.5 | 2.5 | 2.5 | 3.6 |
| Thickness Tw (mm) | 2.5 | 2.5 | 2.5 | 4.0 |
| Thickness Ts (mm) | 0 | 2.5 | 2.5 | 2.5 |
| Thickness Tm (mm) | 0 | 2.5 | 2.5 | 2.5 |
| Rolling resistance | 100 | 100 | 100 | 100 |
| Steering stability performance | 100 | 103 | 105 | 108 |
| Ride comfort performance | 100 | 103 | 103 | 108 |

As shown in Table 1, the working example 1 can achieve the steering stability performance and the ride comfort performance which are more excellent than the comparative examples 1 to 3, while maintaining the rolling resistance. The comparative examples 2 and 3 are excellent in the ride comfort performance in comparison with the comparative example 1. It can be thought that this is because the height of the rim strip rubber having the higher modulus than the side wall rubber is great, and the damping performance at the tire maximum width position is improved.

What is claimed is:

1. A pneumatic tire comprising:
   a carcass layer which gets to a bead portion from a tread portion via a side wall portion on both sides of the tire, at least one of the sides of the tire further comprising:
   a side reinforcing layer which extends in a tire radial direction from the bead portion to the side wall portion;
   a side wall rubber which forms an outer surface of the side wall portion; and
   a rim strip rubber which forms an outer surface of the bead portion,
   wherein an annular bead core and a bead filler provided in an outer side in the tire radial direction of the bead core are buried in the bead portion,
   wherein the rim strip rubber extends in the tire radial direction between the carcass layer and the side wall rubber, and a radial height of the rim strip rubber from an outer diameter position of the bead core is equal to or more than 70% of a radial height of a tire outer diameter position from the outer diameter position of the bead core,
   wherein an upper end of the side reinforcing layer is arranged closer to an outer side in the tire radial direction than an upper end of the bead filler, and a distance in the tire radial direction from a tire maximum width position to the upper end of the side reinforcing layer is equal to or less than 5 mm,
   wherein the maximum thickness Tw of the rim strip rubber in a first radial height region between the upper end of the bead filler and the upper end of the side reinforcing layer is formed greater than the maximum thickness Tm of the rim strip rubber closer to the outer side in the tire radial direction than the upper end of the side reinforcing layer, and
   wherein the thickness Tw of the rim strip rubber is equal to or more than 1.1 times of the maximum thickness Tm.

2. The pneumatic tire according to claim 1, wherein a radial height of the rim strip rubber from a bead base line is equal to or more than 75% of a tire cross sectional height.

3. The pneumatic tire according to claim 1, wherein an outer peripheral surface of the rim strip rubber in the first radial height region is formed by a first curved surface which bulges to an outer side in a tire width direction.

4. The pneumatic tire according to claim 3, wherein an outer peripheral surface of the rim strip rubber in a second radial height region between an exposed position of an interface between the side wall rubber and the rim strip rubber, and the upper end of the bead filler is formed by a second curved surface which is depressed to an inner side in the tire width direction, and the second curved surface is smoothly connected to the first curved surface.

5. The pneumatic tire according to claim 1, wherein the thickness of the rim strip rubber is reduced little by little from an exposed position of an interface between the side wall rubber and the rim strip rubber toward the outer side in the tire radial direction to be a minimum thickness Tn of the rim strip rubber within a second radial height region between the exposed position of the interface and the upper end of the bead filler, and is increased little by little therefrom toward the outer side in the tire radial direction to be the thickness Tw.

6. The pneumatic tire according to claim 1, wherein the upper end of the side reinforcing layer is arranged at the tire maximum width position or arranged closer to the outer side in the tire radial direction than the tire maximum width position.

7. The pneumatic tire according to claim 1, wherein the thickness Tw of the rim strip rubber is equal to or more than 1.1 times of a thickness Ts of the rim strip rubber at an upper end position of the side reinforcing layer.

8. The pneumatic tire according to claim 1, wherein the thickness Tw of the rim strip rubber is equal to or more than 1.1 times of a minimum thickness Tn of the rim strip rubber within a second radial height region between an exposed position of an interface between the side wall rubber and the rim strip rubber, and the upper end of the bead filler.

9. The pneumatic tire according to claim 1, wherein a wound-up end of the carcass layer, wound up in the bead portion so as to pinch the bead core and bead filler, reaches a belt layer which is buried in the tread portion.

* * * * *